June 3, 1958 — M. PERPIGNANI ET AL — 2,837,244
MEASURING AND DISPENSING DEVICE

Filed Jan. 14, 1955 — 4 Sheets-Sheet 1

INVENTORS:
MARINO PERPIGNANI
OTTO E. WERNER

BY *Waryall Johnston,
Cook & Root*
ATT'YS

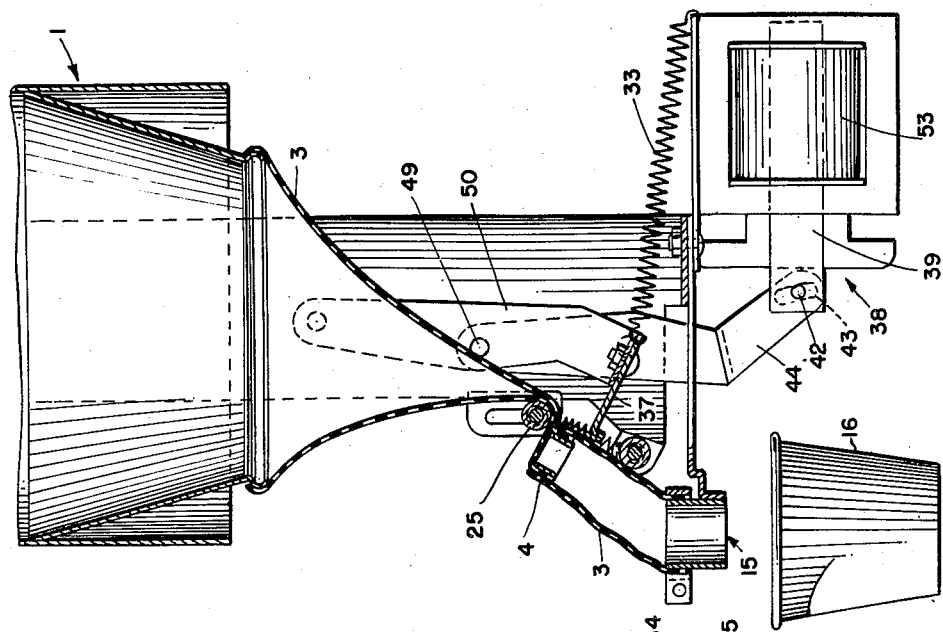

June 3, 1958  M. PERPIGNANI ET AL  2,837,244
MEASURING AND DISPENSING DEVICE
Filed Jan. 14, 1955  4 Sheets-Sheet 3
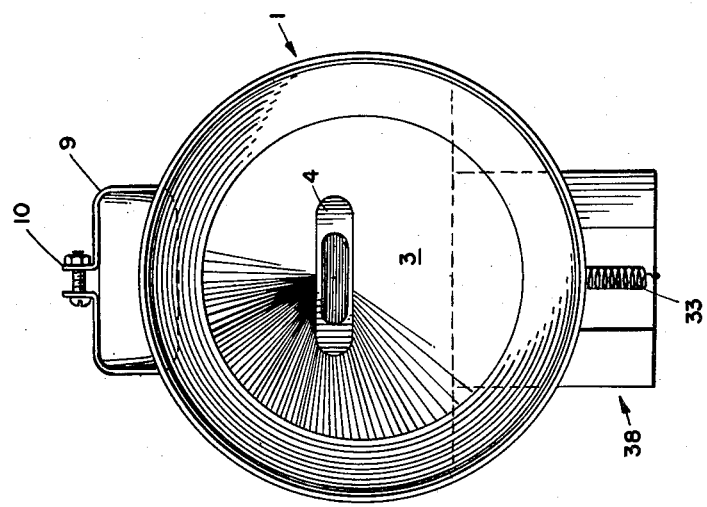
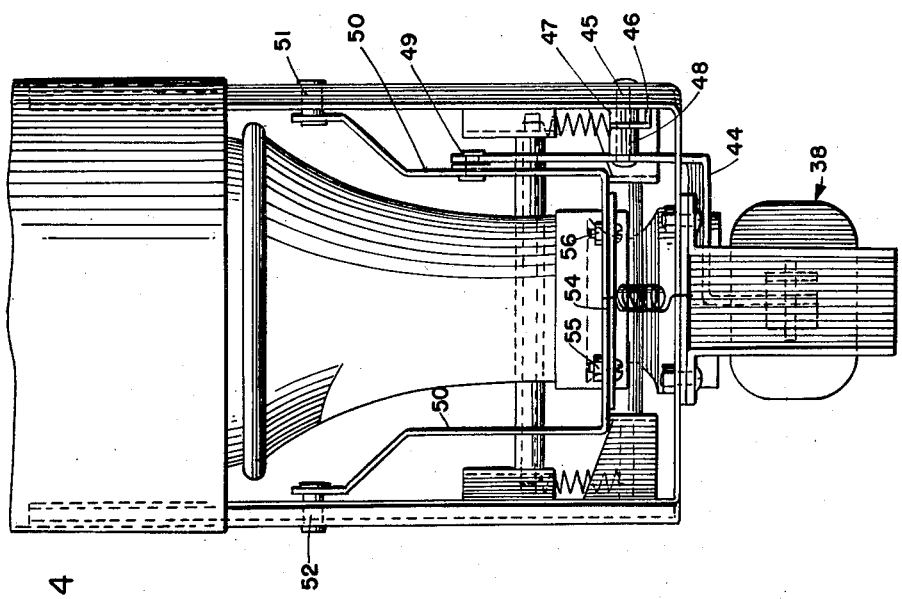
INVENTORS:
MARINO PERPIGNANI
OTTO E. WERNER
BY
ATT'YS June 3, 1958    M. PERPIGNANI ET AL    2,837,244
MEASURING AND DISPENSING DEVICE Filed Jan. 14, 1955    4 Sheets-Sheet 4

INVENTORS:
MARINO PERPIGNANI
OTTO E. WERNER

BY
ATT'YS

United States Patent Office 2,837,244
Patented June 3, 1958

2,837,244

MEASURING AND DISPENSING DEVICE

Marino Perpignani, Round Lake, and Otto E. Werner, Skokie, Ill., assignors to Automatic Canteen Company of America, Chicago, Ill., a corporation of Delaware Application January 14, 1955, Serial No. 481,742

6 Claims. (Cl. 222—135)

This invention relates to a measuring and dispensing device, more particularly a measuring and dispensing device for measuring and dispensing flowable materials from a storage reservoir through a measuring chamber to a suitable point of discharge. The invention is especially concerned with the measuring and dispensing of powdered materials in vending machines such as machines for making coffee, cocoa, hot chocolate, soups and other beverages where one of the beverage ingredients used in mixing the beverage in the machine is a powdered material.

It is known in the art to dispense a powder from a magazine tube through a flexible tube connected to a measuring receptacle provided with a flap valve as disclosed in Thompson, United States Letters Patent 2,660,340. One of the disadvantages of a device of this type is that the opening of the flap valve to discharge the powder from the measuring receptacle produces a throwing effect which causes dust, the effect being somewhat similar to that obtained by the pitching action with a shovel. In using a device of this type, it is practically essential to provide a common collector for the powdered material and a chute from the collector to a suitable receptacle, such as a cup. As a result variations occur in the amount of the powdered ingredient which is actually charged into the cup with consequent variations in the quality of the beverage produced. This arrangement is also undesirable in that it becomes necessary at times to clean the collector.

One of the objects of the present invention is to provide a measuring and dispensing device for flowable materials, especially powders, which is essentially dustless.

Another object of the invention is to provide a measuring and dispensing device for flowable materials, such as powders, which has no opening between the storage reservoir and the point of discharge into a cup or other receptacle.

A further object of the invention is to provide a measuring and dispensing device for powders and other flowable materials which does not require the use of a common collector other than the cup and is capable of discharging a measured amount of a powdered ingredient directly into a cup.

A still further object of the invention is to provide a measuring and dispensing device of the type described which delivers substantially constant proportions from a measuring receptacle to a point of discharge.

An additional object of the invention is to provide a powder measuring and dispensing mechanism having a measuring receptacle disposed in a flexible tube intermediate between a discharge opening of a storage container and a discharge position to a cup or other receiving receptacle whereby the flexible tube on both sides of the measuring receptacle completely encloses the powdered material from the time it leaves the storage receptacle until the time a measured quantity is discharged into a receiving receptacle.

Another object of the invention is to provide a new and improved device of the type described characterized by the employment of a unique method for closing the flexible tube alternately intermediately between the discharge opening from the storage receptacle and the measuring receptacle and intermediately between the measuring receptacle and the discharge position to a receiving receptacle.

A further object of the invention is to provide a measuring and dispensing device of the type described in which the means for closing the flexible tube and for opening it to discharge a measured quantity of material does not involve the use of a flap valve or similar type of valve.

Another object of the invention is to provide an operating mechanism which makes it possible to exert the maximum power of a solenoid in discharging the contents of a measuring receptacle and simultaneously sealing the top of the receptacle against the introduction from a storage reservoir of additional quantities of the material to be measured.

Other objects and advantages of the invention will be apparent by reference to the following description in conjunction with the following drawings in which:

Fig. 2 is an enlarged detail view, partly in section, of a portion of the device shown in Fig. 1, illustrating the position occupied by the measuring receptacle when the latter is filled with a powdered ingredient to be dispensed;

Fig. 3 is a view similar to that in Fig. 2 illustrating the position of the measuring receptacle when the powdered material is discharged therefrom;

Fig. 4 is a rear view with parts broken away of the device shown in Fig. 1;

Fig. 5 is a top plan view of the device shown in Fig. 4;

Figure 1:
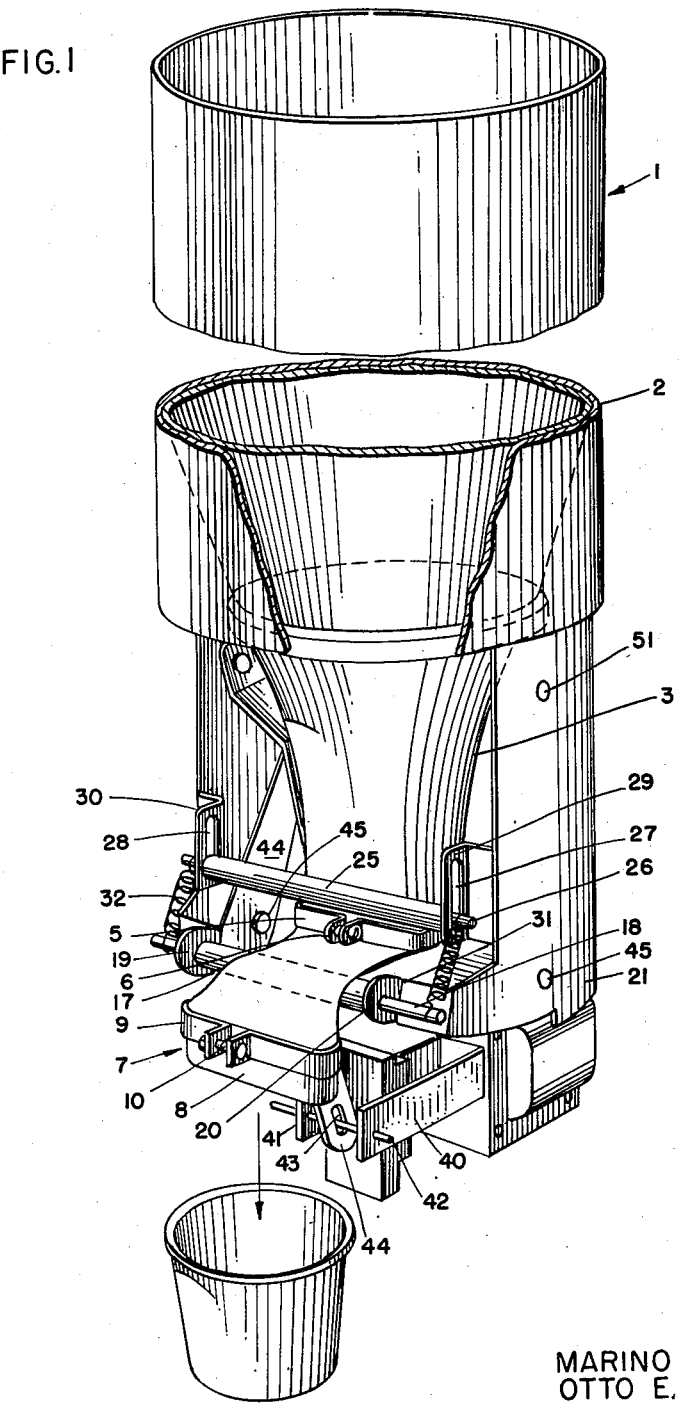
Fig. 1 is an elevational view with parts broken away of a measuring and dispensing device provided in accordance with the invention.

In general, the invention may be described as providing a dispensing mechanism for a flowable material comprising a storage reservoir or container for the flowable material, a constant volume measuring receptacle having an inlet and an outlet opening, a flexible tube connecting said storage reservoir to said inlet opening, a flexible tube connecting said outlet to a point of discharge and means for alternately closing said flexible tube to said inlet opening and said flexible tube from said outlet opening.

The preferred means for closing the flexible tube is to provide a mechanism for pinching the tube. By providing a measuring receptacle disposed in a flexible tube intermediate between the discharge opening from the storage reservoir and the point of discharge into a cup or other receiving receptacle, the powdered ingredient being dispensed is entirely enclosed during the measuring and dispensing operation and cannot form dust. In this manner, also delivery of a substantially constant proportion is attained. At the same time it is possible to introduce a powdered material into the measuring receptacle and remove it therefrom in a very simple manner.

While the general principles of the invention can be embodied in various types of devices, a preferred type of measuring and dispensing device is illustrated in the drawings. This device is especially suitable for use in automatic vending machines such as, for example, machines for making and vending coffee, cocoa, hot chocolate, soups and similar products made from powdered beverage ingredients. While the invention will be hereinafter described in detail with respect to a single measuring and dispensing unit, it will be understood that a plurality of such units will normally be employed in a beverage making machine. For example, in a machine adapted to prepare and dispense coffee, at least three such units will ordinarily be used, one to contain coffee, another for sugar and a third for powdered cream. By actuating selected units, coffee can be prepared without cream, with cream, with sugar or with sugar and cream. In the same beverage making and dispensing machine a fourth unit can be provided for measuring and dispensing powdered cocoa which usually contains milk solids and sugar mixed with the cocoa. In such machines various types of mechanisms are provided to deliver cups to a position beneath the discharge opening for the powdered ingredients. Such machines are also provided with a mechanism for delivering hot water or other liquid carrier to the cup.

In the single measuring and dispensing device shown in Fig. 1, the measuring and dispensing mechanism comprises a storage reservoir for the powdered ingredient generally shown at 1 which is fastened at 2 to a flexible tube 3 which is generally funnel-shaped in order to conduct the powdered material to a measuring receptacle 4 (Fig. 2). The measuring receptacle 4 is clamped in position within the tube 3 by means of a clamp 5 which can be tightened or loosened by a machine screw 6. The tube 3 continues beyond the clamp 6 to a discharge position generally indicated at 7. At this point, the lower end of the tube 3 is preferably clamped between a tubular member 8 which fits within the lower end of the flexible tube 3 and is held on the outside by a clamp 9 which can be loosened or tightened by a machine screw 10. It will be apparent that the measuring receptacle 4 can readily be removed from the flexible tube 3 by loosening clamp 9 to disengage the lower end of the flexible tube 3 from the tubular member 8 and then loosening clamp 5 to permit the receptacle 4 to disengage from the intermediate portion of the tube 3. Measuring receptacles of various capacities can be substituted for receptacle 4 or inserts can be provided in receptacle 4 to decrease the volume of material measured therein.

The tubular member 8 is fastened to an extension 11 of the frame 12 by welding or in any other suitable manner.

The upper end of the flexible tube 3 is stretched over a beaded portion 13 at the lower end of the generally funnel-shaped section 14 of the magazine tube or storage reservoir 1 as shown in Figs. 2 and 3. Since the flexible tube 3 is made of an elastic material, such as substantially pure natural rubber, it can be readily removed merely by pulling or stretching the upper end adjacent the bead 13 until the tube becomes disengaged from the bead. In this manner, the entire flexible tube assembly, including the measuring receptacle 4, can be removed for cleaning merely by the release of the clamp 9.

As best shown in Figs. 2 and 3, the tubular member 8 provides a discharge opening 15 through which a powdered ingredient can be dispensed into a cup or any other suitable receptacle 16. At a point intermediate between the upper end of the tubular member 8 and the lower end of the measuring receptacle 4 a roller 17 is provided which is mounted on a shaft 18 supported by brackets 19 and 20 extending outwardly from the frame member 21. The roller 17 can be described as a fixed roller because although it can be rotated it does not move laterally with respect to the frame. This roller can also be described as a sealing roller because it is so arranged with respect to the measuring receptacle 4 that when the device is in the position shown in Fig. 2, the lower end of the receptacle 4 will be sealed by contact with the flexible tube 3 at points 22 and 23. The tube is also sealed where it is pinched by the roller at point 24. It will be observed that this sealing blocks the outlet end of the measuring receptacle 4. However, in the rest position shown in Fig. 2, the upper or inlet end of the measuring receptacle 4 is open, thereby permitting any powdered ingredient present in the magazine tube 1 to fill the measuring receptacle 4.

Above and in an offset position with respect to sealing roller 17 is a second sealing roller 25 mounted on a shaft 26 which is adapted to move up and down in slots or openings 27 and 28 in brackets 29 and 30, respectively (Fig. 1) which are a part of the frame 21. Two coil springs 31 and 32 are fastened to shafts 18 and 26, respectively, and normally retain roller 25 in its lowermost position. However, under pressure exerted by the lateral movement of the mechanism hereinafter described, roller 25 is free to move upwardly under spring tension. Roller 25 can also be described as a sprung sealing roller.

The normal or rest position shown in Fig. 2 is maintained by a spring 33 fastened at one end 34 to the solenoid housing 35 and at the other end 36 to a movable frame 37.

After the measuring receptacle 4 has been filled with a powdered ingredient from the magazine tube 1, its contents are discharged by moving it laterally to an offset position as shown in Fig. 3. This movement is accomplished by means of a solenoid generally shown at 38. The solenoid piston 39 is provided at its outer end with a pair of arms 40 and 41 (Fig. 1) which hold a shaft 42. The shaft 42 passes through an elongated opening 43 in a lever 44. The lever 44 at its lower end has an inverted L-shape (see Fig. 4), one leg of the L containing the slotted opening 43. An intermediate portion of the lever 44 is pivotally mounted on a stub shaft 45 which in turn is fastened to the frame by a bracket 46. Collars 47 and 48 are provided to maintain the relative position of the bracket with respect to the frame and the lever 44 with respect to the bracket. The lever 44 is pivotally fastened by means of a rivet 49 or other suitable means to a yoke member 50. The yoke member 50 is pivotally mounted on stub shafts 51 and 52 which are fastened to the frame 21.

In the normal or rest position shown in Fig. 2, the solenoid piston 39 is in its natural position with the plunger extended to the left. In the operated position shown in Fig. 3, the solenoid 53 has been energized thereby drawing the solenoid piston 39 inwardly and causing the lever 44 to move to the right. As the lever 44 moves to the right the slot 43 will rise somewhat with respect to the shaft 42 and then restore substantially to a central position when the solenoid piston reaches the maximum of its inward stroke. Since the lever 44 is pivotally connected at 49 to an upwardly extending arm of the yoke member 50, as the lever 44 moves to the right it causes the yoke member 50 to move to the left. The lower end 54 of the yoke member 50 is fastened by means of bolts 55 and 56 or other suitable means (Fig. 4) to the movable frame member 37 which in turn is fixed to the clamp 5 around the outside of the flexible tube 3 encasing the measuring receptacle 4. This causes the measuring receptacle 4 to move to the left as shown in Fig. 3 and discharge its contents through the lower part of the flexible tube 3 to the discharge opening 15 and thence into cup 16. At the same time, the sprung sealing roller 25 pinches the flexible tube 3 at a point immediately adjacent the measuring receptacle 4 so that no more powdered ingredient from the magazine tube 1 can flow into the measuring receptacle 4, and only a measured quantity of the powdered ingredient is delivered to the discharge opening 15. When the solenoid 53 is de-energized, the spring 33 restores the measuring receptacle 4 to its rest or filling position shown in Fig. 2. The measuring receptacle 4 is then refilled by gravity with the powdered ingredient from magazine tube 1 and the operation can be repeated in a similar manner as often as the solenoid 53 is energized and deenergized. The spring 33 should preferably be of such nature as to permit restoration of the mechanism to its rest position without causing undue force to be exerted against the pressure of the spring by the solenoid when the mechanism is moved to its operated position.

The particular operating mechanism is especially advantageous in that the discharge of the contents of the measuring receptacle is accomplished during the operation of the stroke of the solenoid piston when the greatest force is exerted by the solenoid. Thus, it is possible to use a smaller solenoid than would be the case if the solenoid piston were connected, for example, directly to the yoke 54. This advantage is due to the increased leverage obtained by pivoting lever 44 from the frame and exerting force on the yoke member 50 from the end of lever 44 by means of the solenoid piston.

To summarize the operation of the measuring and dispensing device, a powdered ingredient or other flowable material is placed in magazine tube 1 and fills the funnel-shaped portion 14 as well as the upper part of flexible tube 3 and also measuring receptacle 4 while the mechanism occupies its rest position shown in Fig. 2. In this position the outlet of the tubular measuring receptacle 4 is closed by means of the flexible tube 3 which is stretched over the ends 22 and 23 due to the position of the fixed sealing roller 17. When the solenoid is moved to the operated position of the mechanism as shown in Fig. 3, the measuring receptacle 4 moves to the left and the sprung roller 25 moves over the top of the measuring receptacle 4 stretching the flexible tube 3 over the top of the measuring receptacle 4 and pinching off the tube 3 so that additional quantities of a powdered ingredient or other flowable material from the magazine tube 1 cannot enter the measuring receptacle 4. Simultaneously, since the bottom of the measuring receptacle 4 is now open, the contents are discharged into the lower end of the flexible tube 3 and pass through the discharge opening 15 into the cup 16. When the solenoid 53 is de-energized, the spring 33 restores the mechanism to its rest position shown in Fig. 2 and the operation is ready to be repeated.

While the employment of a flexible tube to connect a storage reservoir to a measuring receptacle and the pinching off of the tube to seal the storage reservoir from the measuring receptacle has heretofore been described in U. S. Patent 2,660,340, the present invention has the advantage that no dust is produced in the surrounding atmosphere when the contents of the measuring receptacle are discharged because the discharge passageway is completely enclosed by the flexible tube. Furthermore, the present invention makes it possible to seal off the lower end of the measuring receptacle by means of a flexible tube rather than a flap valve or similar device. The sealing of the measuring receptacle at both the inlet and the outlet ends of the measuring receptacle by stretching the flexible tube over said ends results in the dispensing of a substantially constant measured quantity of material. This is particularly important in vending machines where the measured quantity of material is relatively small as, for example, two to four grams, and a substantial deviation in the measured amount will impair the quality of a drink prepared from the measured material.

Figure 6:
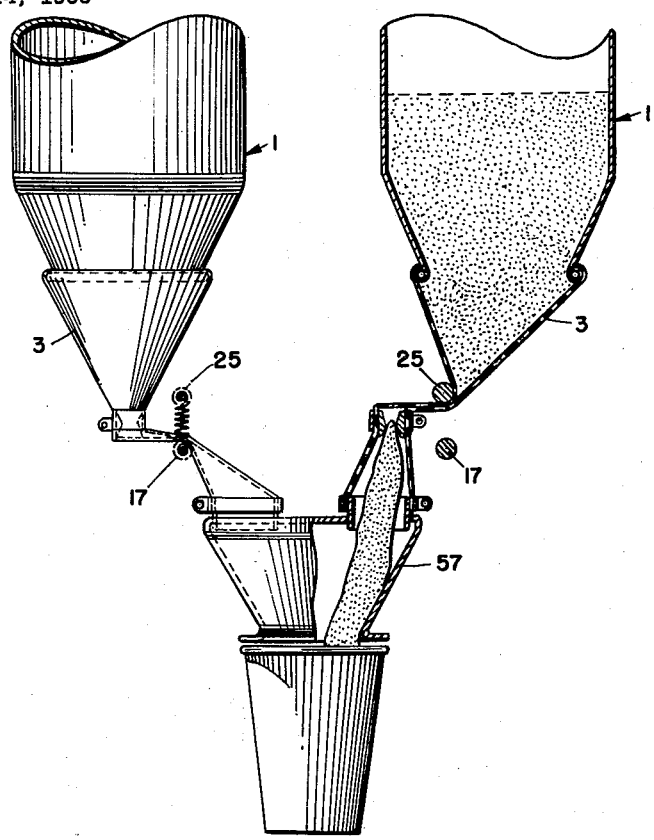
Fig. 6 is an elevational view illustrating the employment of two measuring and dispensing devices of the type herein described arranged to deliver powdered materials to a common receiving receptacle.
Figure 7:
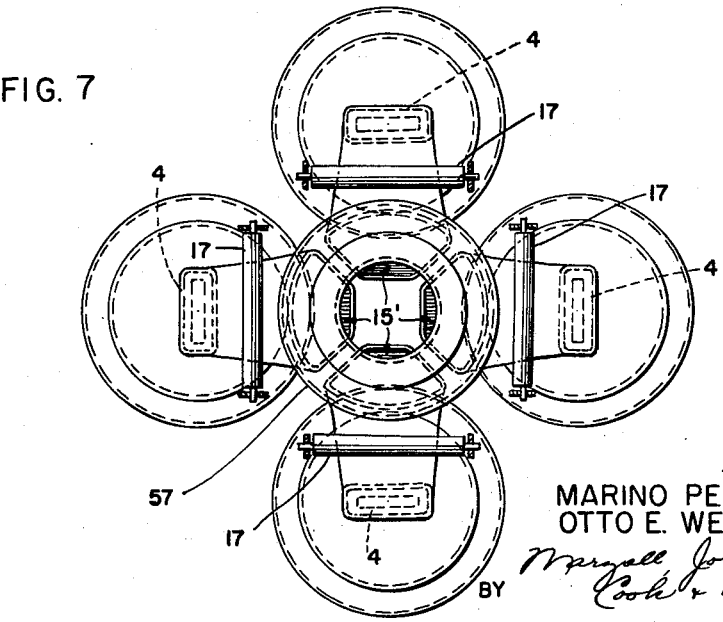
Fig. 7 is a bottom view looking upward illustrating the arrangement of four measuring and dispensing devices provided in accordance with the invention.

As previously indicated, a plurality of measuring and dispensing devices of the type herein described are employed in making beverages or the like where two or more powdered ingredients are used. Thus, in Fig. 6, two measuring and dispensing units are shown arranged over a common chute 57, the lefthand unit being in the rest position and the righthand unit in the operated position. In Fig. 7 an arrangement with four measuring and dispensing units is illustrated in the rest position. Each of the measuring and dispensing units employed in this construction is the same as the unit described in Figs. 1 to 4, except that the discharge openings 15' are shaped differently from the discharge openings 15 of the unit described in Fig. 4. It will be understood, of course, that the employment of a chute 57 is not absolutely essential and several measured materials can be discharged directly into a cup in the manner described with respect to Figs. 1 to 4.

Measuring and dispensing units of the type described herein can be employed in many different types of apparatus where it is desired to measure and dispense a substantially constant quantity of a flowable material. The invention is especially useful, however, in beverage making machines such as machines of the type disclosed in U. S. Patents 2,660,340 and 2,660,351. The components of the machine such as the cup dispensing apparatus, the coin mechanism if the machine is a vending machine, and the portion of the apparatus for supplying hot water, carbonated water, or other liquids to be used in making a beverage, do not constitute a part of the present invention and therefore are not described in detail herein.

The invention is hereby claimed as follows:

1. A measuring and dispensing mechanism comprising a storage container for a flowable material having a discharge opening, a flexible elastic tube connecting said discharge opening to a discharge position, a constant volume tubular measuring receptacle enclosed in said flexible tube at an intermediate point between said discharge opening and said discharge position, said measuring receptacle having an inlet on one side toward said storage container and an outlet on the opposite side toward said discharge position and said flexible tube being clamped to the outside of said measuring receptacle, and means for alternately stretching said flexible tube over the inlet opening of said measuring receptacle and then over the outlet opening of said measuring receptacle to seal off said inlet opening while permitting gravity discharge of the contents of said measuring receptacle from the outlet opening and to seal off the outlet opening while permitting said measuring receptacle to be refilled from said storage container.

2. A measuring and dispensing mechanism comprising a vertically disposed magazine tube adapted to contain a powdered material, a movable, constant volume measuring receptacle for said powdered material mounted adjacent the lower end of said magazine tube, said measuring receptacle having top and bottom openings, a flexible elastic tube connecting the lower end of said magazine tube to the top opening of said measuring receptacle, a flexible elastic discharge tube connecting the bottom opening of said measuring receptacle to a point of discharge, means to move said measuring receptacle from a position in which said top opening of said measuring receptacle is substantially beneath the lower end of said magazine tube to a position offset therefrom, means operative during said movement to seal off said measuring receptacle by stretching said tube over the top opening of said measuring receptacle, means to restore said measuring receptacle to its initial position, and means operative during said restoration to seal off said bottom opening of said measuring receptacle by stretching said tube over the bottom opening of said measuring receptacle.

3. A measuring and dispensing mechanism comprising a plurality of vertically disposed magazine tubes each adapted to contain a powdered material, a movable, constant volume measuring receptacle for said powdered material mounted below the lower end of each said magazine tube, said measuring receptacle having top and bottom openings, a flexible tube connecting the lower end of each said magazine tube to the top opening of its respective measuring receptacle, a flexible discharge tube connecting the bottom opening of each said measuring receptacle to a point of discharge over a common receiving receptacle, means to move each said measuring receptacle from a position in which said top opening of said measuring receptacle is substantially beneath the lower end of said magazine tube to a position offset therefrom, means operative during said movement to seal off said measuring receptacle by stretching said tube over the top opening of said measuring receptacle, means to restore each said measuring receptacle to its initial position, and means operative during said restoration to seal off said bottom opening of said measuring receptacle by stretching said tube over the bottom opening of said measuring receptacle.

4. A measuring and dispensing mechanism comprising a magazine tube adapted to contain a powdered material, a flexible tube connecting the lower end of said magazine tube to a point of discharge, a laterally movable, constant volume tubular measuring receptacle clamped in said tube by external clamping means, said measuring receptacle having a top and a bottom opening, means to move said measuring receptacle from a position in which said top opening of said measuring receptacle is substantially beneath the lower end of said magazine tube to a position offset therefrom, roller means operative during said movement to seal off said measuring receptacle by stretching said tube over the top opening of said measuring receptacle, means to restore said measuring receptacle to its initial position, and roller means operative during said restoration to seal off said bottom opening of said measuring receptacle by stretching said tube over the bottom opening of said measuring receptacle.

5. A measuring and dispensing mechanism comprising a magazine tube adapted to contain a powdered material, a flexible tube connecting the lower end of said magazine tube to a point of discharge, a laterally movable, constant volume tubular measuring receptacle clamped in said tube by external clamping means, said measuring receptacle having a top and a bottom opening, means to move said measuring receptacle from a position in which said top opening of said measuring receptacle is substantially beneath the lower end of said magazine tube to a position offset therefrom, roller means operative during said movement to seal off said measuring receptacle by stretching said tube over the top opening of said measuring receptacle, means to restore said measuring receptacle to its initial position, and roller means in a substantially fixed position operative during said restoration to seal off said bottom opening of said measuring receptacle by stretching said tube over the bottom opening of said measuring receptacle.

6. In a measuring and dispensing mechanism having a frame on which is mounted a magazine tube adapted to contain a powdered material, a flexible tube connected to the lower end of said magazine tube, a movable measuring receptacle for said powdered material fastened to said flexible tube, and means to move said measuring receptacle from a filling position in which it is filled with said powdered material to a discharge position where its contents are discharged, the combination of, a solenoid mounted on said frame below said flexible tube having a movable solenoid piston, a lever pivotally mounted at one end to the outer end of said solenoid piston and at the other end to a lever adapted to move said measuring receptacle, both of said levers being pivotally mounted from said frame.

References Cited in the file of this patent

UNITED STATES PATENTS

| | | |
|---|---|---|
| 2,113,022 | Hefti | Apr. 5, 1938 |
| 2,554,570 | Harvey | May 29, 1951 |
| 2,647,661 | Harvey | Aug. 4, 1953 |
| 2,660,340 | Thompson | Nov. 24, 1953 |
| 2,660,351 | Thompson | Nov. 24, 1953 |
| 2,668,637 | Gilmore | Feb. 9, 1954 |
| 2,698,703 | Harvey | Jan. 4, 1955 |
| 2,726,019 | Moran | Dec. 6, 1955 |